US011872430B2

(12) United States Patent
Kjellman

(10) Patent No.: US 11,872,430 B2
(45) Date of Patent: Jan. 16, 2024

(54) INTERNALLY MOUNTED DEVICE FOR THE SUPERVISION OF A FIRE SUPPRESSION SYSTEM

(71) Applicant: UTC Fire & Security Corporation, Farmington, CT (US)

(72) Inventor: Thomas Kjellman, Ashland, MA (US)

(73) Assignee: UTC Fire & Security Corporation, Farmington, CT (US)

( * ) Notice: Subject to any disclaimer, the term of this patent is extended or adjusted under 35 U.S.C. 154(b) by 39 days.

(21) Appl. No.: 17/372,323

(22) Filed: Jul. 9, 2021

(65) Prior Publication Data

US 2021/0331016 A1 Oct. 28, 2021

Related U.S. Application Data

(62) Division of application No. 15/580,147, filed as application No. PCT/US2016/034023 on May 25, 2016, now abandoned.

(60) Provisional application No. 62/172,344, filed on Jun. 8, 2015.

(51) Int. Cl.
*A62C 37/50* (2006.01)
*A62C 35/02* (2006.01)
*A62C 37/36* (2006.01)

(52) U.S. Cl.
CPC .............. *A62C 37/50* (2013.01); *A62C 35/02* (2013.01); *A62C 37/04* (2013.01)

(58) Field of Classification Search
CPC ....... A62C 37/04; A62C 37/50; F16L 2201/10
See application file for complete search history.

(56) References Cited

U.S. PATENT DOCUMENTS 2,470,701 A * 5/1949 Jacobs ................. H01H 15/102 200/61.78
9,714,718 B2 7/2017 Rogala et al.
2006/0145820 A1 7/2006 Rosche
2013/0126328 A1 5/2013 Mainland et al.
2013/0240222 A1 9/2013 Krueger
(Continued)

FOREIGN PATENT DOCUMENTS

EP 0717648 A1 6/1996
WO 199531255 A1 11/1995

OTHER PUBLICATIONS

International Search Report and Written Opinion for PCT Patent Application No. PCT/US2016/034023, dated Jul. 29, 2016.
(Continued)

*Primary Examiner* — Jason J Boeckmann
(74) *Attorney, Agent, or Firm* — Locke Lord LLP; Joshua L. Jones; Gabriella D'angelo

(57) ABSTRACT

A supervised fire suppression system (10, 100) is disclosed that includes a discharge valve (14, 114) for controlling release of a fire extinguishing agent from a container (12), a control head (16, 116) operatively associated with the discharge valve for actuating the discharge valve in the event of a fire, wherein the control head may be removed from the discharge valve to facilitate inspection of the control head, and an internal supervisory switching device (130) mounted within the control head and configured to interact with the discharge valve to provide an indication that the control head has been removed from the discharge valve.

20 Claims, 5 Drawing Sheets

(56) References Cited

U.S. PATENT DOCUMENTS

2013/0269784 A1* 10/2013 Dahlgren ................ F16K 1/308
137/553

OTHER PUBLICATIONS

International Preliminary Report on Patentability for PCT Patent Application No. PCT/US2016/034023, dated Dec. 12, 2017.
Chinese Office Action for Chinese Patent Application No. CN 201680033310.0, dated Oct. 10, 2020.
Extended European Search Report dated Mar. 18, 2022, issued during the prosecution of European Patent Application No. EP 21204722.9.

* cited by examiner

INTERNALLY MOUNTED DEVICE FOR THE SUPERVISION OF A FIRE SUPPRESSION SYSTEM

CROSS-REFERENCE TO RELATED APPLICATIONS

This application is a divisional of U.S. patent application Ser. No. 15/580,147 filed Dec. 6, 2017, which is a U.S. National Stage of International Application No. PCT/US20216/034023 filed May 25, 2016, which claims the benefit of and priority to U.S. Provisional Application No. 62/172,344, filed Jun. 8, 2015, the disclosures of which are hereby incorporated by reference in their entirety.

BACKGROUND OF THE INVENTION

1. Field of the Invention

The subject invention is directed to supervised fire suppression systems, and more particularly, to internally mounted devices for detecting the removal of an actuator intended to activate a discharge valve on a storage container holding pressurized fire suppressant, so as to ensure the actuator is replaced after it has been inspected.

2. Description of Related Art

Fire safety systems installed in buildings typically include at least one electrical panel that is the controlling component of the fire safety system. The control panel is a hub of the safety system. It monitors inputs and system integrity, controls outputs and relays information. The control panel receives information from environmental sensors that detect environmental changes associated with fire, monitors their operational integrity and provides for automatic control of equipment, which may include release of fire suppressant, transmission of information necessary to provide notification to fire fighters, and control of a variety of building functions to prepare the facility for tire based on a predetermined sequence of events.

A typical unit in the system is a storage container which contains a fire extinguishing agent under pressure. The storage container is usually a cylinder and often includes a valve connected to a control head that is connected pneumatically or electrically to the control panel. The control panel can send a signal to the control head to activate a release mechanism, such as a solenoid actuator, opening the valve and releasing the fire extinguishing agent from the container. The agent then passes through an outlet port in the valve to a piping network that distributes the fire extinguishing agent to a series of interconnected nozzles placed throughout an installation, for example, in a building, where the agent is then discharged. The control panel can be programmed to automatically send a signal to the control head to open the valve to release the agent when a detector detects a fire. In certain instances, the valve can also be activated manually.

In the United States, specific monitoring and checks of the control heads and the fire safety system in general are required by National Fire Protection Association (NFPA) standards and codes. This is typically done through physical inspection by trained personnel at the container. It involves manually disconnecting the control head from the valve to physically inspect it at specific intervals, for example, every six months, then reconnecting the control head to the valve. Additionally, agent storage containers must be physically inspected to monitor levels of agent, pressure, temperature and other conditions. Further, cleaning of the fire safety system requires manually disconnecting the control head from the valve, which requires the control head and valve to then be manually reconnected.

SUMMARY OF THE INVENTION

The subject invention is directed to a new and useful fire suppression system that includes a discharge valve for controlling the release of a fire extinguishing agent from a container, and a control head operatively associated with the discharge valve for actuating the discharge valve in the event of a fire, wherein the control head houses an electronic actuator that is operatively associated with the discharge valve for actuating the discharge valve in the event of a fire and the control head may be disengaged or otherwise removed from the discharge valve to facilitate inspection of the electronic actuator.

The system further includes a supervisory switching device mounted within the control head and configured to interact with the discharge valve to provide an indication that the control head has been disengaged or otherwise removed from the discharge valve. Moreover, the switching device communicates with a control panel located remote from the control head where an indication relating to removal of the control head from the discharge valve is provided. The indication may be a visual alarm and/or an audible signal.

The internal supervisory switching device includes an elongated internal switch pin mounted for movement within a complementary bore formed in the control head. More particularly, the internal switch pin is mounted for movement between a first position corresponding to the control head being installed on the discharge valve and a second position corresponding to the control head being removed from the discharge valve.

The internal supervisory switching device further includes a micro switch that cooperates with the internal switch pin to provide an indication that the control head has been removed from the discharge valve. In one embodiment of the invention, the micro switch that cooperates with the internal switch pin is disposed within an internal compartment formed in the control head adjacent to the electronic actuator. In another embodiment of the invention, the micro switch that cooperates with the internal switch pin is disposed within a housing located adjacent to the control head. In this instance, a slidable wedge is positioned within the same adjacent housing, located between the micro switch and the internal switch pin, to facilitate indirect cooperation between the micro switch and the switch pin.

The subject invention is also directed to a supervised fire suppression system that includes a discharge valve for controlling the release of a fire extinguishing agent from a container, a control head housing an electronic actuator that is operatively associated with the discharge valve for actuating the discharge valve in the event of a fire, wherein the control head may be removed from the discharge valve to facilitate inspection of the electronic actuator housed within the control head, and a supervisory switching device including a micro switch housed within the control head and a cooperating internal switch pin mounted to interact with an exterior surface of the discharge valve to provide an indication that the control head has been removed from the discharge valve.

The internal switch pin mounted for movement within a complementary bore formed in the control head. More particularly, the internal switch pin is mounted for movement between a first position corresponding to the control head being installed on the discharge valve and a second position corresponding to the control head being removed from the discharge valve. The micro switch is disposed within an internal compartment formed in the control head adjacent the electronic actuator.

The subject invention is further directed to a supervised fire suppression system that includes a discharge valve for controlling the release of a fire extinguishing agent from a container, a control head housing an electronic actuator that is operatively associated with the discharge valve for actuating the discharge valve in the event of a fire, wherein the control head may be removed from the discharge valve to facilitate inspection of the electronic actuator housed within the control head, and a supervisory switching device including a micro switch housed adjacent to the control head and a cooperating internal switch pin mounted within the control head to interact with an exterior surface of the discharge valve to provide an indication that the control head has been removed from the discharge valve.

The internal switch pin is mounted for movement within a bore formed in the control head. More particularly, the internal switch pin is mounted for movement between a first position corresponding to the control head being installed on the discharge valve and a second position corresponding to the control head being removed from the discharge valve. The micro switch is disposed within a housing external to the control head. A slidable wedge is positioned within the same exterior housing, and is located between the micro switch and the internal switch pin to facilitate indirect cooperation between the micro switch and the switch pin.

These and other features of the supervised fire suppression system of the subject invention and the manner in which it is made and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the supervised fire suppression system of the subject invention without undue experimentation, preferred embodiments thereof will be described in detail herein below with reference to certain figures, wherein.

DETAILED DESCRIPTION OF PREFERRED EMBODIMENTS

Figure 1:
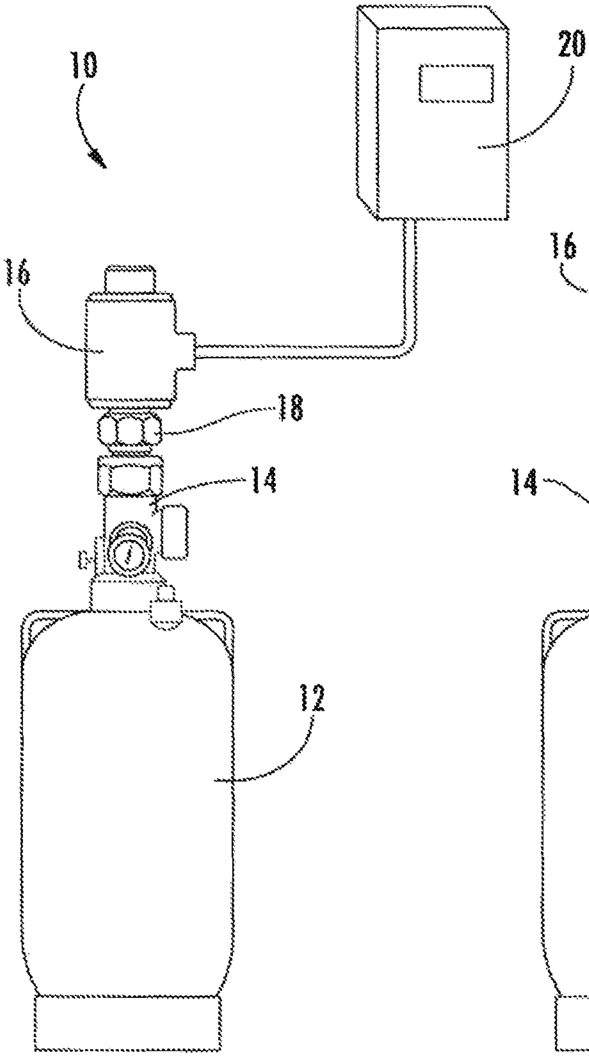
FIG. 1 is a schematic illustration of a supervised fire suppression system constructed in accordance with a preferred embodiment of the subject invention, wherein the control head is attached to the discharge valve on the storage container holding a pressurized fire extinguishing agent, and the system communicates with a control panel located remote from the control head.

Referring now to the drawings, wherein like reference numerals identify similar structural features or aspects of the subject invention, there is illustrated in FIG. 1 a fire suppression system constructed in accordance with an embodiment of the subject invention which is designated generally by reference numeral 10.

The fire suppression system 10 of the subject invention includes a container or cylinder 12 for storing a pressurized fire extinguishing agent. A discharge valve assembly 14 is operatively associated with the container 12 for controlling the release of the fire extinguishing agent therefrom. An electronic control head 16 is installed onto the valve assembly 14 by way of a threaded swivel nut 18. The control head 16 houses an electronic solenoid valve knot shown) for actuating the valve assembly 14 in the event of a fire.

Figure 2:
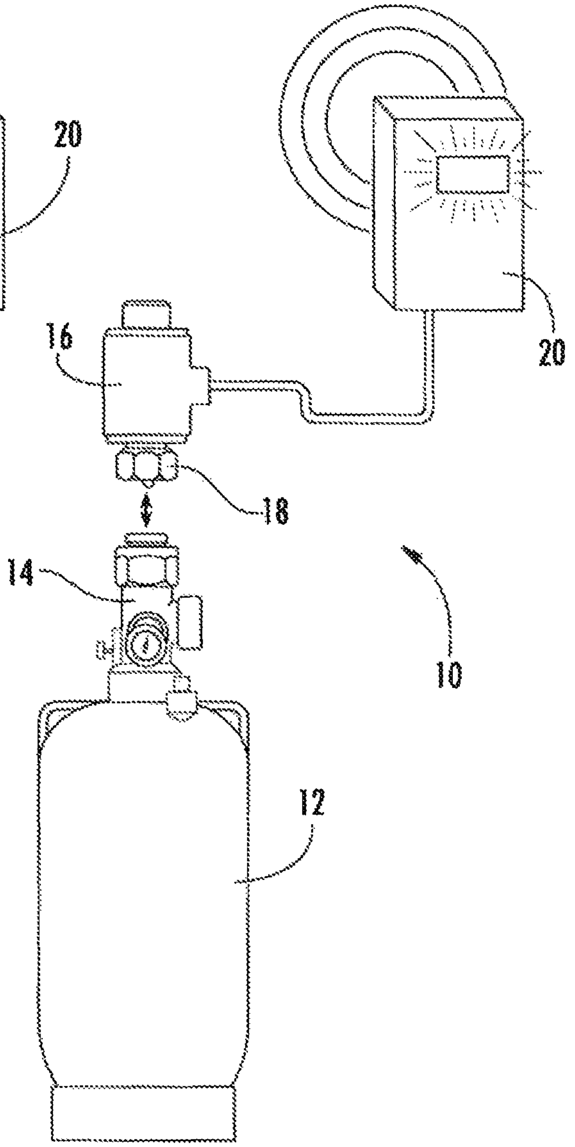
FIG. 2 is a schematic illustration of the supervised fire suppression system shown in FIG. 1, wherein the control head has been removed from the discharge valve on the storage container, as indicated by a visible and/or audible signal emanating from the control panel.

The control head 16 is adapted and configured to be readily removed from the valve assembly 14 by way of the swivel nut 18 to facilitate scheduled maintenance checks and monitoring of the solenoid valve housed therein, as shown for example in FIG. 2. Periodic inspection of the control head and the fire safety system in general are required by National Fire Protection Association (NFPA) requirements.

In one aspect of the subject invention, the control head 6 communicates with a control panel 20 that is located remote from the control head 16, where an indication relating to system impairment, and more particularly, to the removal of the control head 16 is provided. The communication link is typically a wired connection as illustrated in FIGS. 1 and 2, but it is envisioned that the control head 16 could be wirelessly linked to the control panel 20.

Upon removal of the control head 16 from the valve assembly 14 for inspection and/or maintenance, the indication provided at the control panel 20 can be an audible signal and/or a visual alarm. When the actuator 16 is connected to or otherwise properly installed on the valve assembly 14 after it has been inspected, the control panel 20 can provide a signal indicating that the fire suppression system 10 is ready.

Figure 3:
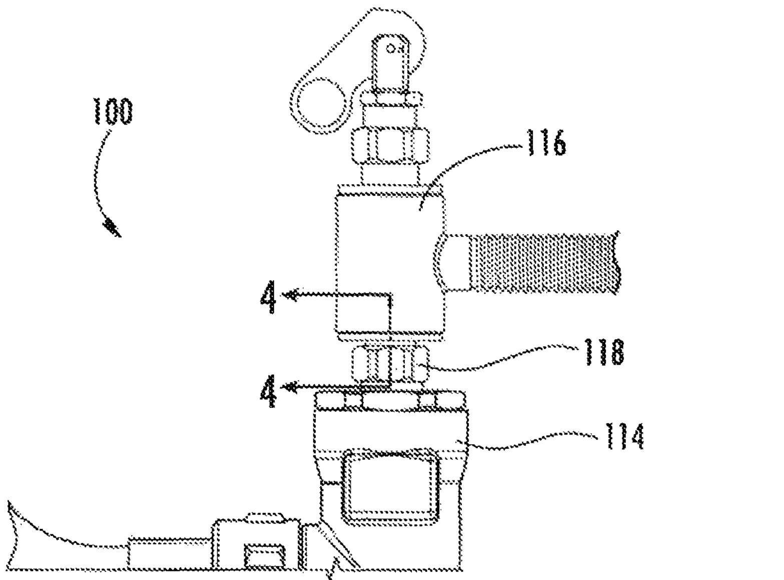
FIG. 3 is a localized side elevational view of an embodiment of the supervised fire suppression system of the subject invention, with the control head installed on the discharge valve.
Figure 4:
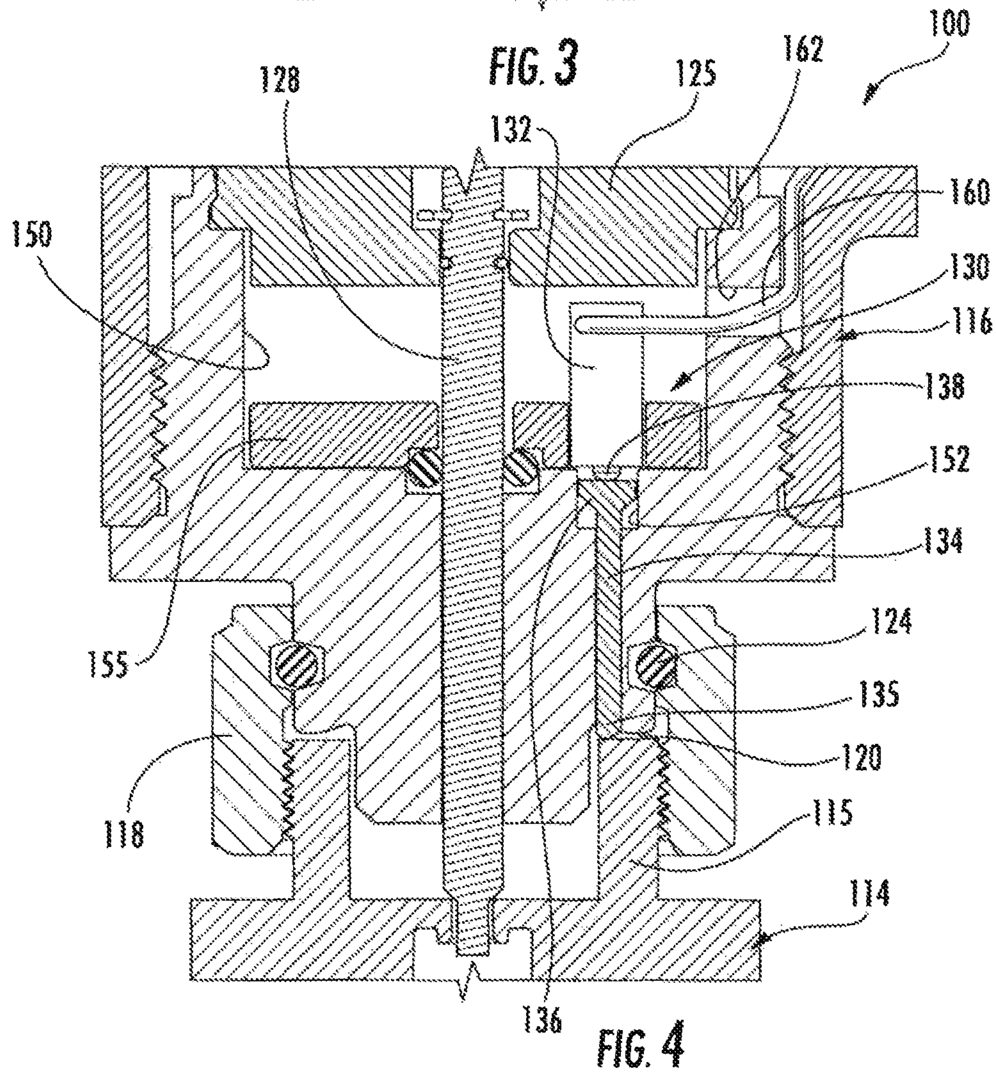
FIG. 4 is a cross-sectional view taken along line 4-4 of FIG. 3, illustrating internal components of the control head, including the internal supervisory switching device of the subject invention, when the internal switch pin is in a first position contacting an exterior surface of the discharge valve.

Referring now to FIGS. 3 and 4, there is illustrated a supervised fire suppression system constructed in accordance with an embodiment of the subject invention, which is designated generally by reference numeral 100. Fire suppression system 100 includes a discharge valve 114 for controlling the release of a fire extinguishing agent from a container (see FIGS. 1 and 2). The system 100 further includes a control head 116 that houses an electronic actuator 125, which is operatively associated with the discharge valve 114 and includes an activation pin 128 for actuating the discharge valve 114 in the event of a fire.

Figure 5:
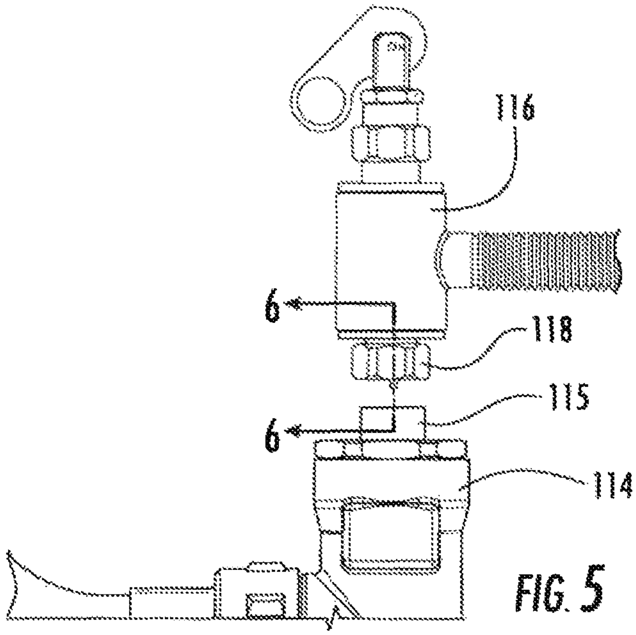
FIG. 5 is a localized side elevational view of the supervised fire suppression system of the subject invention, with the control head removed from the discharge valve to facilitate inspection and/or maintenance of the electronic actuator housed within the control head.
Figure 6:
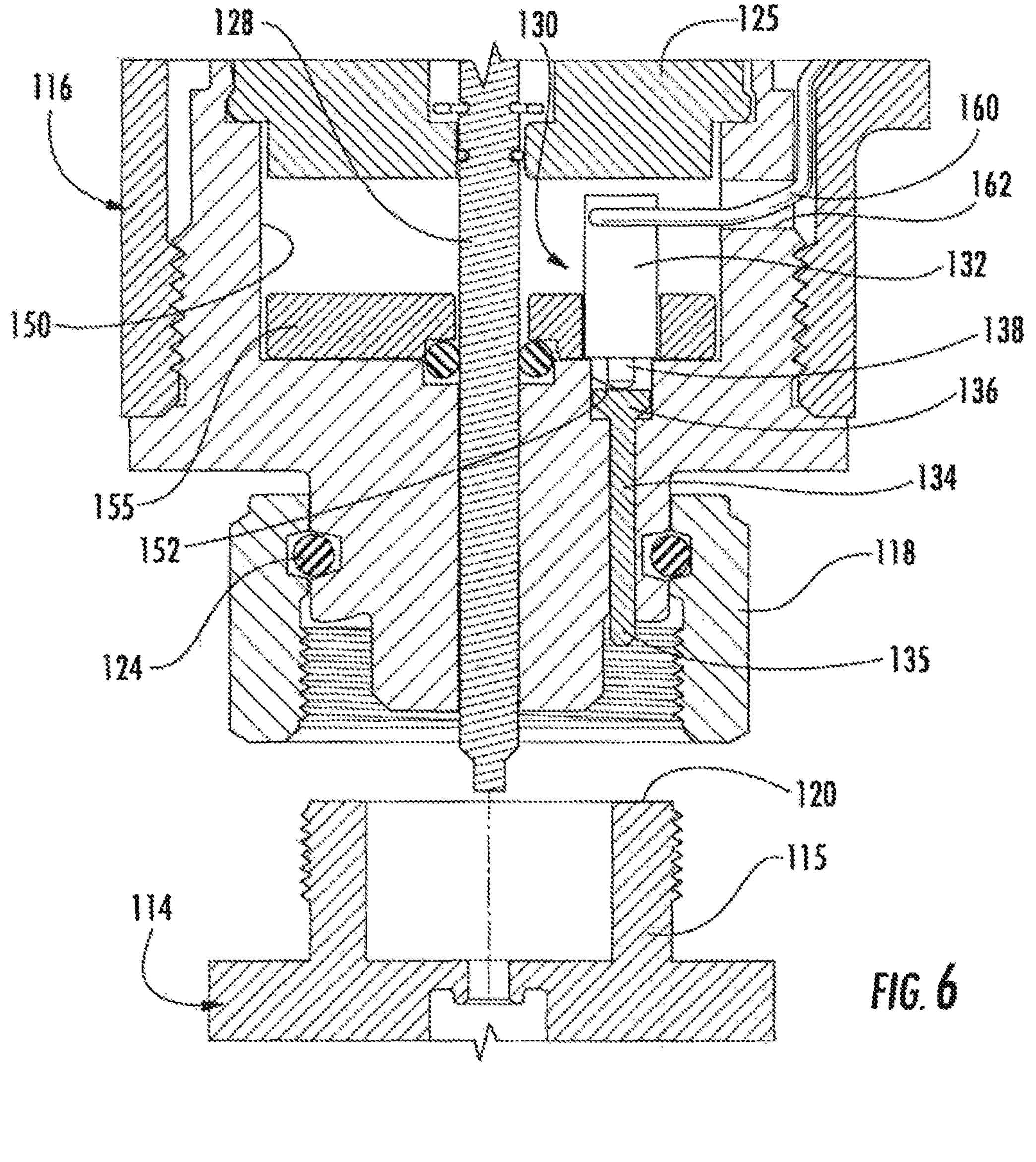
FIG. 6 is a cross-sectional view taken along line 6-6 of FIG. 5, illustrating the internal components of the control head, with the internal switch pin in a second position out of contact with the discharge valve.

The control head 116 may be removed from the discharge valve 114 by way of a threaded swivel nut 118 secured to the control head 116 with a lock ring 124 to facilitate inspection and/or maintenance of the electronic actuator 125 housed within the control head 116, as illustrated for example in FIGS. 5 and 6. The system 100 further includes an internal supervisory switching mechanism, designated generally by reference numeral 130, which communicates with a control panel located remote from the control head 116 where an indication relating to removal of the control head 116 from the discharge valve 114 is provided (see FIGS. 1 and 2).

The internal supervisory switching mechanism 130 includes a micro switch 132 housed within an interior chamber 150 of the control head 116 and a cooperating switch pin 134 mounted for movement within a bore 152 formed in the control head 116 and communicating with chamber 150. The micro switch 132 communicates with a remotely located control panel by way of a communication cable 160 that preferably extends through an existing cable pathway 162 formed in control head 116. The micro switch 132 is supported within a seat 155 that is located within the interior chamber 150 of control head 116. The micro switch 132 is positioned in a vertical orientation, so that the spring biased contact pin 138 associated therewith directly contacts the tapered head 136 of the switch pin 134.

The distal tip 135 of switch pin 134 is configured to interact with or otherwise reference an upper exterior surface 120 of the neck 115 of the discharge valve 114 to provide an indication that the control head 116 has been removed from the discharge valve 114. More particularly, the switch pin 134 is mounted for movement between a first position, shown in FIG. 4, corresponding to the control head 116 being installed on the discharge valve 114, and a second position, shown in FIG. 6, corresponding to the control head 116 being removed from the discharge valve 114 to facilitate inspection and/or maintenance of the electronic actuator 125 housed in control head 116. When control head 116 is removed from valve assembly 114, switch pin 134 travels downward in bore 152 under the bias of the contact pin 138 of micro switch 132. This will cause the micro switch 132 to change state, providing an indication that the control head 116 has been removed from the discharge valve assembly 114.

Figure 7:
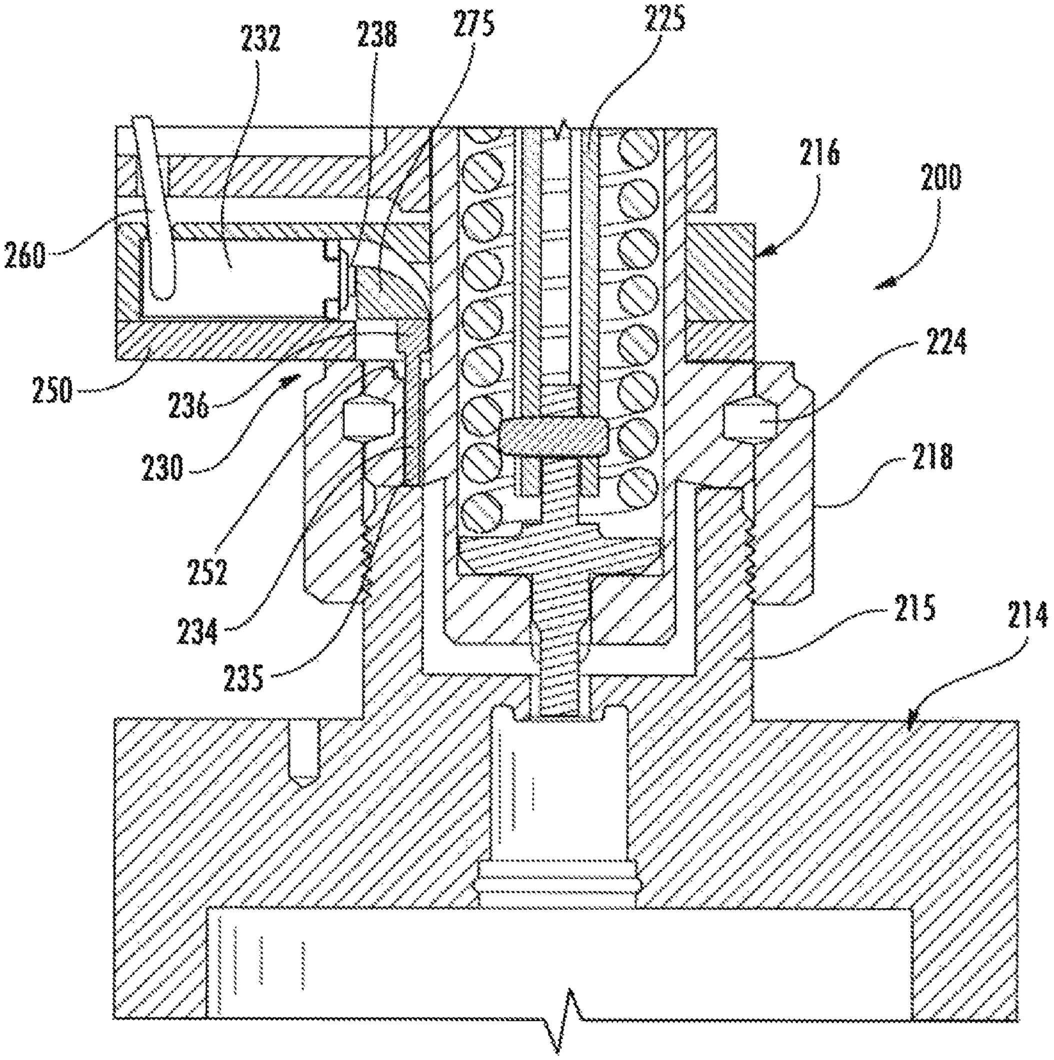
FIG. 7 is a cross-sectional view of another embodiment of the supervised fire suppression system of the subject invention, wherein the supervisory switching device includes a micro switch mounted in a housing adjacent to the control head which interacts with a switch pin mounted within the control head.
Figure 8:
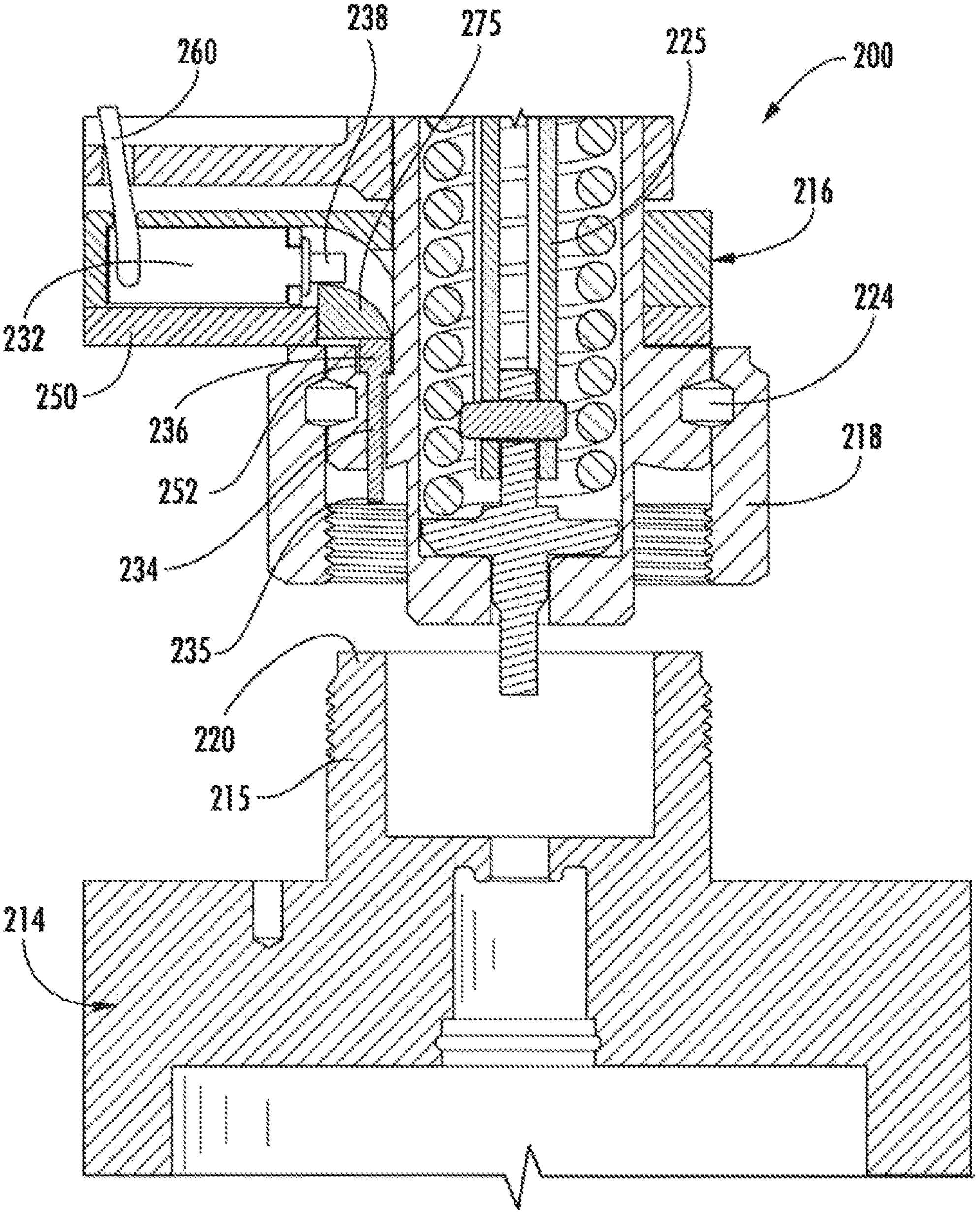
FIG. 8 is a cross-sectional view of the supervised fire suppression as in FIG. 7, with the control head removed from the discharge valve to facilitate inspection and/or maintenance of the electronic actuator housed within the control head.

Referring now to FIGS. 7 and 8, there is illustrated another embodiment of a supervised fire suppression system constructed in accordance with an embodiment of the subject invention, which is designated generally by reference numeral 200. Fire suppression system 200 includes a discharge valve 214 for controlling the release of a fire extinguishing agent from a container (see FIGS. 1 and 2). The system 200 further includes a control head 216, which houses an electronic actuator 225 that is operatively associated with the discharge valve 214 for actuating the discharge valve 214 in the event of a fire.

The control head 216 may be removed from the discharge valve 214 by way of a threaded swivel nut 218, which is secured to the control head 216 with a lock ring 224 to facilitate inspection and/or maintenance of the electronic actuator 225 housed within the control head 216. The fire suppression system 200 further includes an internal supervisory switching mechanism, which is designated generally by reference numeral 230, which communicates with a control panel located remote from the control head 216 where an indication relating to removal of the control head 216 from the discharge valve 214 is provided.

The supervisory switching mechanism 230 includes a micro switch 232 supported within a housing 250 located adjacent to or otherwise adjoining the control head 216, located above the swivel nut 218, so as not to interfere with the existing structural geometry of the system. The switching mechanism 230 further includes a cooperating internal switch pin 234 mounted for movement within a bore 252 formed in the control head 216. The micro switch 232 communicates with a remotely located control panel by way of a communication cable 260 that preferably extends from the housing 250.

The micro switch 232 is positioned in a horizontal orientation within the adjoining housing 250. In addition, a curved wedge member 275 is provided in the housing 250 to interact with the internal switch pin 234. The wedge member is located between the spring biased contact pin 238 of the micro switch 232 and the enlarged head 236 of the internal switch pin 234 located within bore 252 of control head 216. The interaction of the micro switch 232 and internal switch pin 234 through the wedge member 275 will be described in more detail below.

The distal tip 235 of switch pin 234 is configured to interact with or otherwise reference an upper exterior surface 220 of the neck 215 of the discharge valve 214 to provide an indication that the control head 216 has been removed from the discharge valve 214. More particularly, the internal switch pin 234 is mounted for movement between a first position, shown in FIG. 7, corresponding to the control head 216 being installed on the discharge valve 214, and a second position, shown in FIG. 8, corresponding to the control head 216 being removed from the discharge valve 214.

When control head 216 is removed from valve assembly 214 together with swivel nut 218, internal switch pin 234 travels downward in bore 252 under the indirect biasing force exerted by the contact pin 238 of micro switch 232, which is transferred through the curved wedge member 275 in adjoining housing 250. This will cause the micro switch 232 to change state, providing an indication that the control head 216 has been removed from the discharge valve assembly 214 to facilitate inspection and/or maintenance of the electronic actuator 225 housed within control head 216.

Those skilled in the art will readily appreciate that the internally mounted supervisory switching devices of the subject invention facilitate compliance with regulatory standards that require actuator supervision, benefiting the manufacturers and suppliers of fire suppression systems. The subject invention also benefits the end user of the system by providing an additional safeguard against improper maintenance. Furthermore, the subject invention provides benefits to the system installation/maintenance provider, reducing the chance of damages resulting from inactivity of a disabled system.

While the internally mounted supervisory switching devices subject invention has been shown and described with reference to preferred embodiments, those skilled in the art will readily appreciate that various changes and/or modifications may be made thereto without departing from the spirit and scope of the subject invention as defined by the appended claims

What is claimed is:

1. A supervised fire suppression system comprising:
a) a discharge valve for controlling the release of a fire extinguishing agent from a container;
b) a control head operatively associated with the discharge valve for actuating the discharge valve in the event of a fie, wherein the control head may be disengaged from the discharge valve to facilitate inspection of the control head; and
c) an internal supervisory switching device mounted within the control head and configured to interact with the discharge valve to provide an indication when the control head has been disengaged from the discharge valve, wherein the supervisory switching device includes a micro switch that cooperates with an internal switch pin to provide an indication that the control head has been removed from the discharge valve, wherein the micro switch that cooperates with the internal switch pin is disposed within an adjoined housing adjacent to the control head, wherein a slidable wedge is positioned within the adjoined housing between the micro switch and the internal switch pin to facilitate indirect cooperation between the micro switch and the switch pin, wherein the slidable wedge is separate from the micro switch and the internal switch pin.

2. A supervised fire suppression system as recited in claim 1, wherein the micro switch is configured to move in a direction perpendicular to the internal switch pin.

3. A supervised fire suppression system as recited in claim 1, wherein the adjoined housing is radially outward of the control head.

4. A supervised fire suppression system as recited in claim 1, wherein the slidable wedge is a curved wedge member having a partially curved outer profile.

5. A supervised fire suppression system as recited in claim 4, wherein the partially curved outer profile of the slidable wedge includes a quarter arc.

6. A supervised fire suppression system as recited in claim 1, wherein the micro switch includes a spring biased contact pin configured to move between a first state and a second state, wherein in the second state the micro switch is configured to provide an indication that the control head has been removed from the discharge valve assembly, wherein the spring biased contact pin is biased towards the second state.

7. A supervised fire suppression system as recited in claim 6, wherein the slidable wedge member is positioned in the housing between the spring biased contact pin of the micro switch and an enlarged head of the internal switch pin to hold the spring biased contact pin in the first state, wherein the internal switch pin is located within a bore of control head.

8. A supervised fire suppression system as recited in claim 1, wherein a distal tip of the switch pin is configured to interact with an upper exterior surface of a neck of the discharge valve.

9. A supervised fire suppression system as recited in claim 1, wherein the internal switch pin is mounted for movement between a first position corresponding to the control head being installed on the discharge valve, and a second position, corresponding to the control head being removed from the discharge valve.

10. A supervised fire suppression system as recited in claim 9, wherein when the internal switch pin is in the first position, it is configured to hold the spring biased pin of the micro switch in the first state, and when the internal switch pin moves to the second position, the spring biased contact pin of the micro switch moves to the second state to indicate that the control head has been removed from the discharge valve.

11. A supervised fire suppression system as recited in claim 10, wherein the micro switch communicates with a remotely located control panel to provide the indication that the control head has been removed from the discharge valve based on the state of the spring biased contact pin of the micro switch.

12. A supervised fire suppression system as recited in claim 1, wherein the micro switch communicates with a remotely located control panel to provide the indication that the control head has been removed from the discharge valve based on a state of a spring biased contact pin of the micro switch.

13. A supervised fire suppression system as recited in claim 1, wherein the slidable wedge is a curved wedge member having a partially curved outer profile, wherein the partially curved outer profile of the slidable wedge includes a quarter arc.

14. A supervised fire suppression system as recited in claim 2, wherein the internal switch pin is configured to travel downward in the bore under an indirect biasing force exerted by horizontal movement of the micro switch through the slideable wedge member.

15. A supervised fire suppression system comprising:
a) a discharge valve for controlling the release of a fire extinguishing agent from a container;
b) a control head housing an electronic actuator that is operatively associated with the discharge valve for actuating the discharge valve in the event of a fire, wherein the control head may be removed from the discharge valve to facilitate inspection of the electronic actuator housed within the control head; and
c) a supervisory switching device including a micro switch housed adjacent to the control head and a cooperating internal switch pin mounted within the control head to interact with a surface of the discharge valve to provide an indication that the control head has been removed from the discharge valve, wherein a slidable wedge is positioned within the adjoined housing between the micro switch and the internal switch pin to facilitate indirect cooperation between the micro switch and the switch pin, wherein the slidable wedge is separate from the micro switch and the internal switch pin.

16. A supervised fire suppression system as recited in claim 15, wherein the internal switch pin mounted is for movement within a bore formed in the control head.

17. A supervised fire suppression system as recited in claim 15, wherein the internal switch pin is mounted for movement between a first position corresponding to the control head being installed on the discharge valve and a second position corresponding to the control head being removed from the discharge valve.

18. A supervised fire suppression system as recited in claim 15, wherein the adjoined housing is radially outward of the control head.

19. A supervised fire suppression system as recited in claim 16, wherein, when the control head is removed from valve assembly the internal switch pin travels downward in the bore under the indirect biasing force exerted by the contact pin of micro switch, wherein the indirect biasing force is transferred through the curved wedge member in the adjoining housing, causing the micro switch to change state and providing an indication that the control head has been removed from the discharge valve assembly.

20. A supervised fire suppression system as recited in claim 15, wherein the micro switch is configured to move in a direction perpendicular to the cooperating internal switch pin.

* * * * *